(12) United States Patent
Tsai et al.

(10) Patent No.: US 8,405,315 B2
(45) Date of Patent: Mar. 26, 2013

(54) ENERGY-SAVING LAMP

(75) Inventors: Chih-Jen Tsai, Taipei Hsien (TW);
Wei-Chih Kuo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 320 days.

(21) Appl. No.: 12/981,548

(22) Filed: Dec. 30, 2010

(65) Prior Publication Data

US 2012/0161644 A1 Jun. 28, 2012

(51) Int. Cl.
*H05B 37/00* (2006.01)
(52) U.S. Cl. .................. 315/149; 315/158; 315/159
(58) Field of Classification Search .......... 315/291, 315/307, 308, 149, 157, 158, 159, 156, 152, 315/154, 153, 150, 151
See application file for complete search history.

(56) References Cited

U.S. PATENT DOCUMENTS

| | | | | |
|---|---|---|---|---|
| 6,583,573 B2 * | 6/2003 | Bierman | ........................ | 315/149 |
| 7,969,097 B2 * | 6/2011 | Van De Ven | .................. | 315/112 |
| 8,299,775 B2 * | 10/2012 | Landis et al. | .................... | 324/66 |
| 2010/0102750 A1 * | 4/2010 | Cheon et al. | .................. | 315/291 |

* cited by examiner

*Primary Examiner* — David H Vu
(74) *Attorney, Agent, or Firm* — Altis Law Group, Inc.

(57) ABSTRACT

An energy-saving lamp includes a light emitting module, a light sensing module and a control module. The light emitting module includes a plurality of light emitting diodes for emitting light. The light sensing module detects a light intensity of the light emitting module and generates a detection signal according to the light intensity of the light emitting module. The control module receives the detection signal generated by the light sensing module and adjusts the total number of lit up light emitting diodes of the light emitting module according to the detection signal.

7 Claims, 2 Drawing Sheets

ENERGY-SAVING LAMP

BACKGROUND

1. Technical Field

The present disclosure generally relates to lamps, and particularly to an energy-saving lamp employing light emitting diodes.

2. Description of Related Art

Nowadays, light emitting diodes (LEDs) are used extensively as a light source for illuminating devices due to their high luminous efficiency and low power consumption. However, most LEDs on today's market can only be adjusted manually, in view of currently popularized energy-saving and emission reduction, providing solution to save energy is needed.

Therefore, what is needed is to provide an energy-saving lamp with that addresses the above mentioned limitation.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
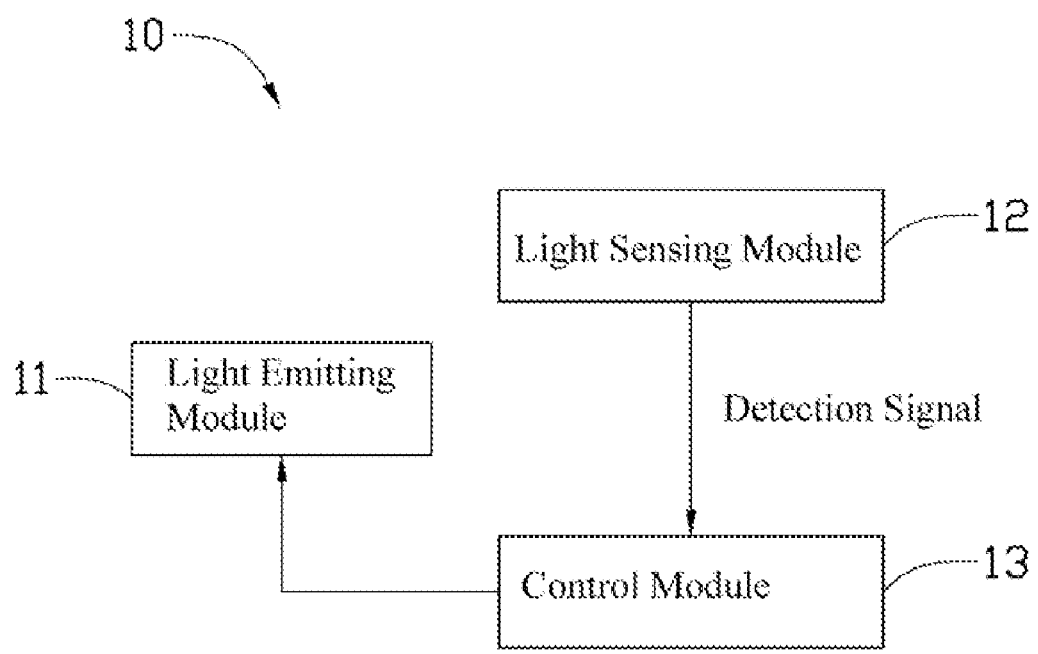
FIG. 1 is a block diagram of an energy-saving lamp in accordance with an exemplary embodiment of the present disclosure.

Reference will now be made to the drawing to describe the present energy-saving lamp, in detail.

Referring to FIG. 1, an energy-saving lamp 10 according to an exemplary embodiment includes a light emitting module 11, a light sensing module 12 and a control module 13.

The light emitting module 11 includes a plurality of light emitting diodes (not illustrated) for emitting light.

The light sensing module 12 is arranged in a light field of the light emitting module 11, thereby receiving light emitted from the light emitting module 11. The light sensing module 12 is configured for detecting a light intensity of the light emitting module 11 and generating a detection signal according to the light intensity of the light emitting module 11. In this embodiment, the light sensing module 12 is a light dependent resistor, a photo diode, or a photo transistor capable of converting a light signal emitted from the light emitting module 11 into an electrical signal as detection signal.

The control module 13 is electrically connected to the light emitting module 11 and the light sensing module 12. The control module 13 is configured for receiving the electrical signal converted by the light sensing module 12, determining how many light emitting diodes of the light emitting module 11 should be lit up, and adjusting the total number of lit up light emitting diodes according to the electrical signal. In an exemplary embodiment, the control module 13 includes a plurality of switches each of which correspondingly electrically connect to one of the plurality of light emitting diodes of the light emitting module 11. Therefore, the control module 13 is capable of adjusting brightness of the energy-saving lamp 10 by selectively controlling the switches to light the light emitting diodes of the light emitting module 11.

The above-disclosed energy-saving lamp 10 employs the light sensing module 12 to detect the light intensity of the light emitting module and generate a detection signal according to the light intensity of the light emitting module. In addition, the energy-saving lamp 10 employs the control module 13 to adjust the total number of light lit by the light emitting diodes of the light emitting module 11 according to the detection signal. Accordingly, the energy-saving lamp 10 adjusts the brightness automatically.

Figure 2:
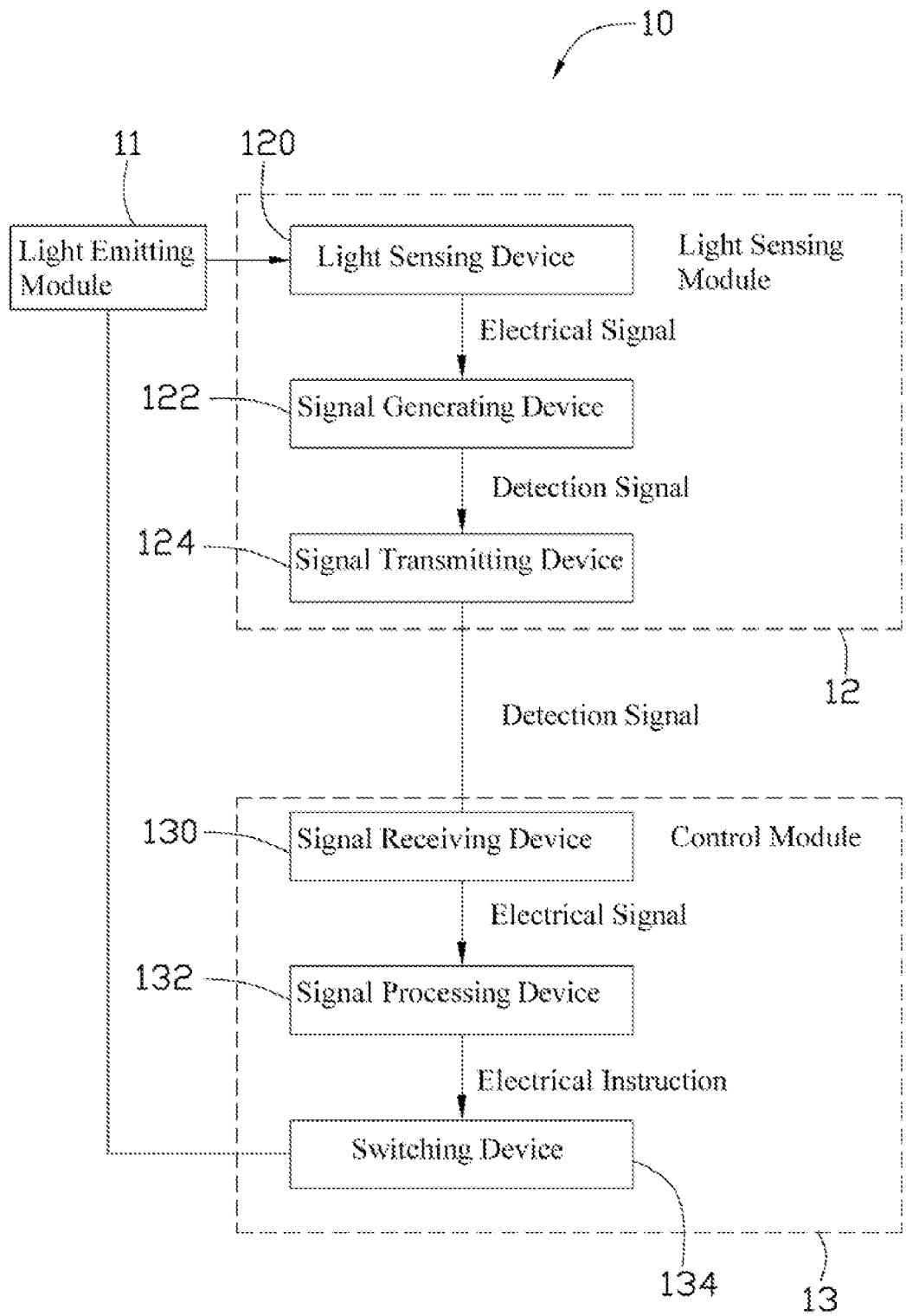
FIG. 2 is a detail block diagram of the energy-saving lamp in FIG. 1.

Referring to FIG. 2, a detail configuration of the energy-saving lamp 10 is illustrated.

In this exemplary embodiment, the light sensing module 12 includes a light sensing device 120, a signal generating device 122 and a signal transmitting device 124.

The light sensing device 120 is configured for converting a light signal emitted from the light emitting module 11 into an electrical signal. In this embodiment, the light sensing device 120 can be a light dependent resistor, a photo diode, or a photo transistor.

The signal generating device 122 is electrically connected to the light sensing device 120. The signal generating device 122 is configured for receiving the electrical signal from the light sensing device 120 and generating a detection signal according to the electrical signal. In this embodiment, the signal generating device 122 can be a micro processor.

The signal transmitting device 124 is configured for transmitting the detection signal to the control module 13. In this embodiment, the signal transmitting device 124 can be a BLUETOOTH device or an infrared device. Therefore, the detection signal can be transmitted using BLUETOOTH or infrared transmission.

The control module 13 includes a signal receiving device 130, a signal processing device 132 and a switching device 134.

The signal receiving device 130 is configured for receiving the detection signal transmitted from the signal transmitting device 124 and converting the detection signal into an electrical signal. In this embodiment, the signal receiving device 130 can be a blue tooth receiving device or an infrared receiving device.

The signal processing device 132 is configured for receiving the electrical signal from the signal receiving device 130, determining a number of light emitting diodes which should be lit up according to the received electrical signal, and sending the number to the switching device 134 in form of a electrical instruction. In this embodiment, the signal processing device 132 can be a micro processor.

The switching device 134 includes a plurality of switches. Each of the switches is correspondingly electrically connected to one of the plurality of light emitting diodes of the light emitting module 11. Therefore, each of the switches controls a corresponding light emitting diode to light or not. As such, the switching device 134 is capable of adjusting the brightness of the energy-saving lamp 10 by controlling the switches to selectively light up the light emitting diodes of the light emitting module 11 according to the electrical instruction from the signal processing device 132.

It is to be noted that, the detection signal is not limited to be transmitted by BLUETOOTH or infrared transmission. For example, the detection signal can also be transmitted by other types of transmission technology such as the Institute of Electrical and Electronics Engineers (IEEE) 802.11 and hence over the internet.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. An energy-saving lamp comprising
a light emitting module comprising a plurality of light emitting diodes for emitting light;
a light sensing module configure for detecting a light intensity of the light emitting module and generating a detection signal according to the light intensity of the light emitting module;
a control module configure for receiving the detection signal generated by the light sensing module and adjusting the total number of lit up light emitting diodes of the light emitting module according to the detection signal.

2. The energy-saving lamp according to claim 1, wherein the light sensing module comprises a light sensing device, a signal generating device and a signal transmitting device,
the light sensing device is configured for converting a light signal emitted from the light emitting module into an electrical signal;
the signal generating device is configured for receiving the electrical signal and generating a detection signal according to the electrical signal; and
the signal transmitting device is configured for transmitting the detection signal to the control module.

3. The energy-saving lamp according to claim 2, wherein the light sensing module is a light dependent resistor, a photo diode or a photo transistor.

4. The energy-saving lamp according to claim 2, wherein the signal transmitting device transmits the detection signal to the control module through the internet.

5. The energy-saving lamp according to claim 2, wherein the signal transmitting device transmits the detection signal to the control module using BLUETOOTH standard.

6. The energy-saving lamp according to claim 2, wherein the signal transmitting device transmits the detection signal to the control module by infrared transmission.

7. The energy-saving lamp according to claim 2, wherein the control module comprises a signal receiving device, a signal processing device and a switching device,
the signal receiving device is configured for receiving the detection signal from the signal transmitting device and converting the detection signal into a electrical signal;
the signal processing device is configured for receiving the electrical signal from the signal receiving device, determining a number of light emitting diodes which should be lit up according to the electrical signal , and sending the number to the switching device in form of a electrical instruction; and
the switching device is configured for selectively lighting up the light emitting diodes according to the electrical instruction.

\* \* \* \* \*